Figure 1:
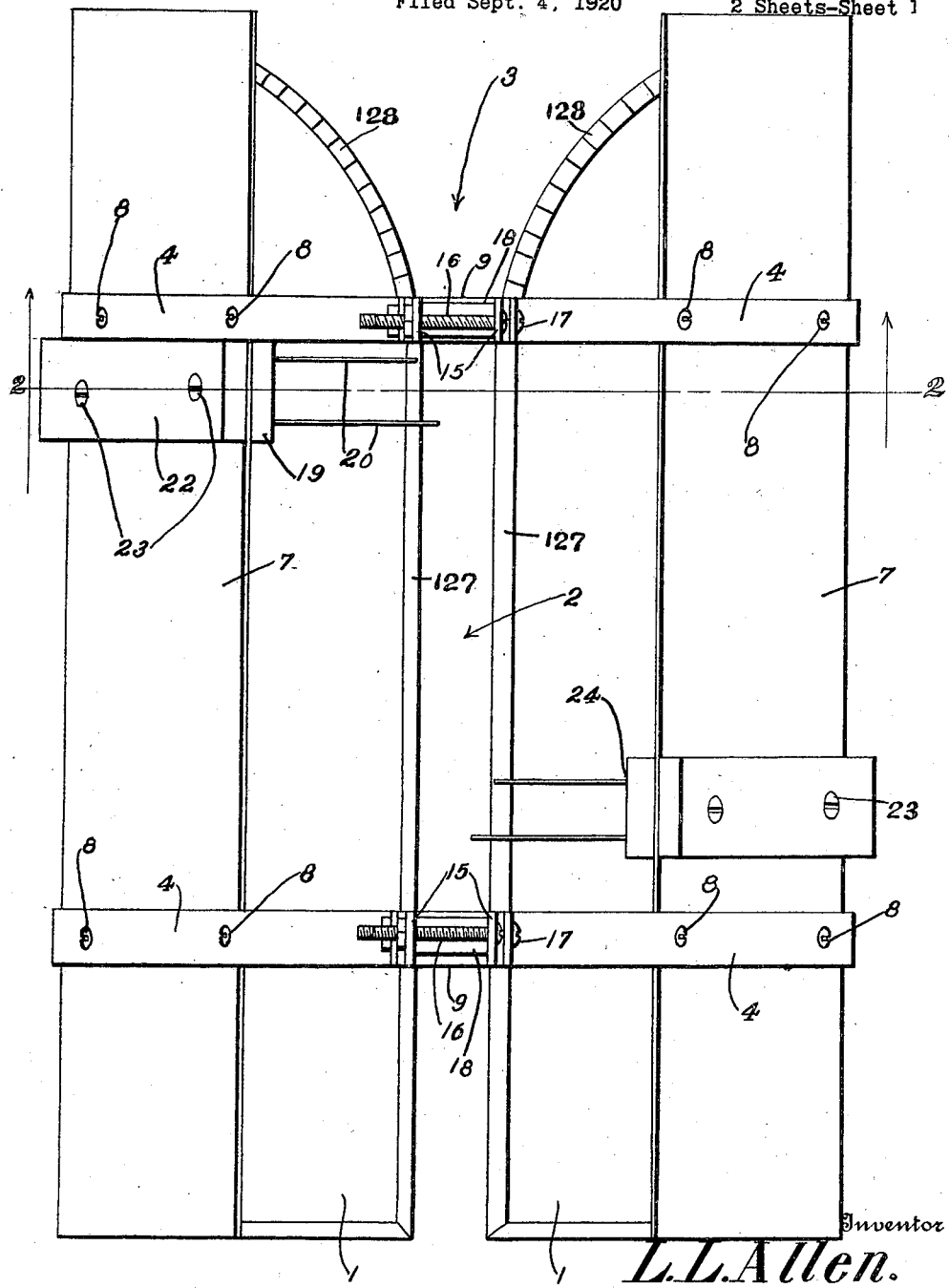

Aug. 28, 1923.

L. L. ALLEN 1,466,106

BOLL WEEVIL CATCHER

Filed Sept. 4, 1920   2 Sheets-Sheet 1

Inventor
L.L.Allen.
By C.A.Snow & Co.
Attorneys

Aug. 28, 1923.

L. L. ALLEN 1,466,106

BOLL WEEVIL CATCHER

Filed Sept. 4, 1920    2 Sheets-Sheet 2

Inventor
L. L. Allen.
By C. A. Snow & Co
Attorney

Patented Aug. 28, 1923.

1,466,106

UNITED STATES PATENT OFFICE.

LEMUEL L. ALLEN, OF LULING, TEXAS.

BOLL-WEEVIL CATCHER.

Application filed September 4, 1920. Serial No. 408,217.

*To all whom it may concern:*

Be it known that I, LEMUEL L. ALLEN, a citizen of the United States, residing at Luling, in the county of Caldwell and State of Texas, have invented a new and useful Boll-Weevil Catcher, of which the following is a specification.

The device forming the subject matter of this application is a boll weevil catcher, and the invention aims to provide a novel arrangement of spring fingers, whereby the boll weevils may be brushed off the standing plants into receptacles.

The invention aims to provide novel means for suspending the receptacles, and, generally, to improve and to enhance the utility of devices of that type to which the invention appertains.

With the above and other objects in view, which will appear as the description proceeds, the invention resides in the combination and arrangement of parts and in the details of construction hereinafter described and claimed, it being understood that, within the scope of what is claimed, changes in the precise embodiment of the invention shown can be made without departing from the spirit of the invention.

In the drawings:—

Figure 3:
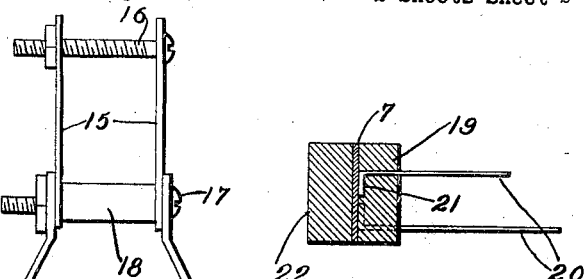
Figure 2:
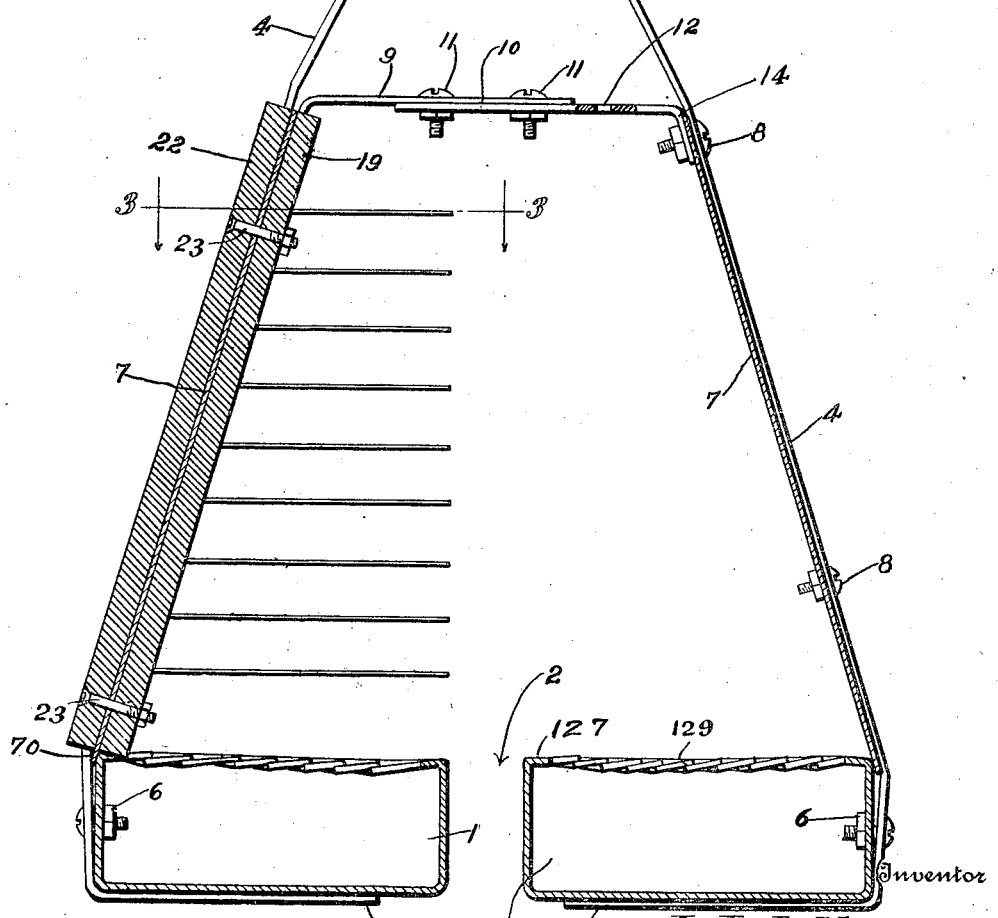

Figure 1 shows in top plan, a device constructed in accordance with the invention; Figure 2 is a cross section on the line 2—2 of Figure 1; and Figure 3 is a section taken on the line 3—3 of Figure 2.

In carrying out the invention, a pair of receptacles 1 is provided, the receptacles 1 being open at the top, the inner walls of the receptacles being spaced apart, as shown at 2 so that the standing plants may pass between the receptacles. The forward ends of the inner walls of the receptacles 1 diverge to form an entering throat 3, whereby the plants are directed into the space 2 between the inner walls of the receptacles 1. Upright supports 4 are provided, the same having feet 5 which extend beneath the receptacles 1. The supports 4 bear against the outer walls of the receptacles 1 and converge as they extend upwardly. Securing elements 6 unite the supports 4 with the outer walls of the receptacles 1. Wings 7, preferably in the form of plates, overhang the receptacles 1. The lower edges of the wings 7 are bound, as shown at 70 between the supports 4 and the outer walls of the receptacles 1. Securing devices 8 attach the wings 7 to the supports 4.

Pairs of spacers 9 are provided, the inner ends of the spacers 9 being overlapped as shown at 10, and being connected by securing members 11, there being a plurality of openings 12 in the spacers 9, the openings being adapted to receive the securing elements 11, to permit an adjustment in the effective length of the spacers 9, to adapt the device to machines of different kinds, and to vary the width of the space 2 between the inner walls of the receptacles 1. The outer ends of the spacers 9 extend downwardly, as shown at 14, and are united, by the uppermost securing devices 8, with the supports 4 and with the wings 7. Hangers 15 are overlapped upon the upper ends of the supports 4, the upper ends of the hangers being united by a bolt 16 or the like. The lower ends of the hangers 15 are connected by a bolt 17 with the upper ends of the supports 4, a spacing sleeve 18 being carried by each bolt 17, and being located between the lower ends of the hangers 15.

The invention includes a carrier 19, which may be a bar of wood or other material, the carrier 19 being disposed against the inner surface of one wing 7, relatively near to the forward end thereof. In the carrier 19 are mounted spring fingers 20 having angular ends 21 which bear against the wing 7. A cleat 22 is mounted on the outer surface of the wing 7, the cleat 22 being connected with the carrier 19 by means of securing elements 23. The spring fingers 20 preferably are disposed in two rows, as shown in Figure 3, the fingers of the forward row being somewhat shorter than the fingers of the rear row, so that the plants may be thoroughly agitated to free them from the boll weevils. As indicated at 24, the construction above described, relating to the spring fingers, is duplicated, at the opposite side of the machine, the spring fingers being carried by the other wing 7 and being located relatively near to the rear end of the said wing.

In practical operation, the device forming the subject matter of this application is mounted on a vehicle of any kind, and is drawn over the cotton fields. The plants enter the space 2 between the receptacles 1, through the throat 3 and come within the field of the spring fingers 20. The spring fingers 20 find their way among the plants and brush the boll weevils therefrom, the weevils falling into the receptacles 1. The device forming the subject matter of this application is simple in construction, but will be found thoroughly efficient for the purposes hereinbefore set forth.

Referring to Figure 1 of the drawings, it will be noted that one set of spring fingers 20 is located relatively near to the forward end of the machine, above one receptacle, another set of spring fingers being located relatively near to the rear end of the machine above the other receptacle. As a consequence, a swinging movement is imparted to the plants, transversely of the line of advance of the machine, the plants coming, first, into contact with the forward set of fingers, and, finally, into contact with the rear set of fingers. Owing to the fact that a transverse swinging movement thus is imparted to the plants, the weevils will be shaken from the plants and will drop into the receptacles 1.

Each receptacle 1 has an inwardly projecting flange 127. At the front of the device, the flange 127 is slit as indicated at 128, to form tongues, the tongues being overlapped on each other as indicated at 129 in Figure 2. The construction above alluded to is a mere mechanical expedient introduced on account of the fact that, at the front of the vehicle, the inner walls of the receptacles 1 diverge to form the entering throat 3.

Having thus described the invention, what is claimed is:—

In a device of the class described, spaced receptacles, wings disposed above the receptacles, and horizontally spaced sets of spring fingers projecting inwardly from the wings and overhanging the receptacles, each set of spring fingers comprising horizontally spaced lines of fingers, the fingers in one line being longer than the fingers of the other line, the longer fingers of each line being disposed to the rear of the shorter fingers in the other line of each set, thereby to increase the efficiency of the fingers when the same come into contact with standing plants.

In testimony that I claim the foregoing as my own, I have hereto affixed my signature in the presence of two witnesses.

LEMUEL L. ALLEN.

Witnesses:
P. J. ALLEN,
C. S. SHADE.